US006696126B1

(12) United States Patent
Fischer et al.

(10) Patent No.: US 6,696,126 B1
(45) Date of Patent: Feb. 24, 2004

(54) VISUAL-TACTILE SIGNAGE

(75) Inventors: Eugene C. Fischer, Stevensville, MD (US); Dale A. Sowell, Falls Church, VA (US); John P. Wehrle, Greenbelt, MD (US); Albert G. Holder, Baltimore, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 215 days.

(21) Appl. No.: 09/372,602

(22) Filed: Aug. 12, 1999

(51) Int. Cl.$^7$ .......................... G09F 13/16; G02B 5/126
(52) U.S. Cl. .................... 428/40.2; 428/42.1; 428/141; 428/143; 428/325; 428/913; 359/515; 359/534; 359/536; 359/538; 359/540
(58) Field of Search .................... 428/40.2, 421, 428/354, 913, 141, 143, 144, 147, 148, 150, 426, 325; 359/515, 534, 536, 538, 540

(56) References Cited

U.S. PATENT DOCUMENTS

| 3,700,305 A | 10/1972 | Bingham | 305/105 |
|---|---|---|---|
| 3,989,775 A | 11/1976 | Jack et al. | 264/1 |
| 4,250,646 A | 2/1981 | Trachtenberg | 40/582 |
| 4,546,042 A | 10/1985 | Quon | 428/378 |
| 4,564,556 A | 1/1986 | Lange | 428/325 |
| 4,758,469 A | 7/1988 | Lange | 428/325 |
| 4,763,985 A | * 8/1988 | Bingham | 350/105 |
| 4,772,511 A | 9/1988 | Wood et al. | 428/325 |
| 4,957,335 A | 9/1990 | Kuney, Jr. | 350/105 |
| 4,983,458 A | 1/1991 | Dejaiffe | 428/402 |
| 5,064,272 A | 11/1991 | Bailey et al. | 350/104 |
| 5,227,221 A | 7/1993 | Hedblom | 428/172 |
| 5,268,789 A | 12/1993 | Bradshaw | 359/534 |
| 5,415,911 A | 5/1995 | Zampa et al. | 428/40 |
| 5,417,515 A | 5/1995 | Hachey et al. | 404/15 |
| 5,424,006 A | 6/1995 | Murayama et al. | 252/301.4 R |

(List continued on next page.)

OTHER PUBLICATIONS

"DuraGlow photoluminescent glow in the dark safety signs and pathway marking," 24 pp, Nov. 5, 1999.*
"Diffraction Brings Street Signs to Life," 3 pp, Jun. 25, 1999.*
"Online Buyers' Guide to Products and Services," American Road & Transportation Builders Association (ARTBA), 2 pp, Jun. 25, 1999.*
Potters Industries Inc., 12 pp, Jun. 25, 1999.*
Koncius, Jura, "Going with the Glow," *The Washington Post,* "Home" section, Thursday, Jul. 15, 1999, pp 1, 3, 10, 11, 13 and 14.

*Primary Examiner*—Harold Pyon
*Assistant Examiner*—Alicia Chevalier
(74) *Attorney, Agent, or Firm*—Howard Kaiser

(57) ABSTRACT

Many embodiments of the present invention are imbued with both sight-facilitative and touch-facilitative characteristics. The invention's unitary resinous matrix configuration encompasses, in the form of small discrete bodies, three genres (luminescent, reflective, retroreflective) of visually enhancing material along with tactilely enhancing material. The retroreflective and abrasive bodies partially project at a light-exposable surface of the resinous matrix material; the luminescent and reflective (diffuse and/or specular) bodies lie beneath the light-exposable surface. The luminescent, reflective and retroreflective bodies are complementarily and cumulatively effective; in particular, they versatilely afford increased visibility at practically all angular lines of sight as well as under practically all deficient illuminative conditions. The abrasive bodies afford vehicular skid prevention, surefootedness and the capability to manually and/or pedally "feel one's way" to safety.

29 Claims, 7 Drawing Sheets

U.S. PATENT DOCUMENTS

| | | | |
|---|---|---|---|
| 5,516,227 A | 5/1996 | Kozak et al. | 404/9 |
| 5,571,362 A | 11/1996 | Hachey et al. | 156/264 |
| 5,576,097 A | 11/1996 | Wyckoff | 428/325 |
| 5,586,787 A | 12/1996 | Brown et al. | 283/67 |
| 5,592,330 A | 1/1997 | Bernard | 359/529 |
| 5,607,621 A | 3/1997 | Ishihara et al. | 252/301.36 |
| 5,660,497 A | 8/1997 | Kozak et al. | 404/14 |
| 5,665,793 A | 9/1997 | Anders | 523/172 |
| 5,670,209 A | 9/1997 | Wyckoff | 427/215 |
| 5,683,746 A * | 11/1997 | Hedblom et al. | 427/163.4 |
| 5,686,022 A | 11/1997 | Muriyama et al. | 252/351.4 R |
| 5,698,301 A | 12/1997 | Yonetani | 428/213 |
| 5,750,191 A | 5/1998 | Hachey et al. | 427/163.4 |
| 5,759,671 A | 6/1998 | Tanaka et al. | 428/166 |
| 5,770,111 A | 6/1998 | Muriyama et al. | 252/301.4 R |
| 5,777,790 A | 7/1998 | Nakajima | 359/536 |
| 5,777,791 A | 7/1998 | Hedblom | 359/536 |
| 5,811,174 A | 9/1998 | Murakami et al. | 428/195 |
| 5,812,316 A * | 9/1998 | Ochi et al. | 359/530 |
| 5,812,317 A | 9/1998 | Bilingsley | 359/536 |
| 5,822,120 A | 10/1998 | Palazzotto | 359/515 |
| 5,873,187 A | 2/1999 | Kozak et al. | 40/612 |
| 5,874,491 A | 2/1999 | Anders | 523/457 |

\* cited by examiner

VISUAL-TACTILE SIGNAGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods, apparatuses and compositions for improving visibility, more particularly for improving visibility of objects or locations by implementing visually enhancing materials.

There are numerous settings wherein it is desirable to enhance the visibility of associated markings or demarcations. For instance, emergency signage should be sufficiently visible, under exigent circumstances, so as to provide guidance for locating exits, pathways or escape routes. Ladders, barriers, roadway markings, etc., should be clearly defined at construction sites. Aircraft landing aids should be appreciable to the pilot above under various adverse conditions.

Photoluminescent (sometimes abbreviated "luminescent") materials, photoreflective materials (sometimes abbreviated "reflective") and retroreflective materials have each been used effectively in a variety of applications for signage and similar delineative purposes. See, e.g., the following United States patents, each of which is hereby incorporated herein by reference: Anders U.S. Pat. No. 5,874,491 issued Feb. 23, 1999; Palazzotto U.S. Pat. No. 5,822,120 issued Oct. 13, 1998; Kozak et al. U.S. Pat. No. 5,873,187 issued Feb. 23 1999; Bilingsley U.S. Pat. No. 5,812,317 issued Sep. 22, 1998; Murakami et al. U.S. Pat. No. 5,811,174 issued Sep. 22, 1998; Hedblom U.S. Pat. No. 5,777,791 issued Jul. 7, 1998; Nakajima U.S. Pat. No. 5,777,790 issued Jul. 7, 1998; Moriyama et al. U.S. Pat. No. 5,770,111 issued Jun. 23, 1998; Tanaka et al. U.S. Pat. No. 5,759,671 issued Jun. 2, 1998; Hachey et al. U.S. Pat. No. 5,750,191 issued May 12, 1998; Yonetani U.S. Pat. No. 5,698,301 issued Dec. 16, 1997; Murayama et al. U.S. Pat. No. 5,686,022 issued Nov. 11 1997; Wyckoff U.S. Pat. No. 5,670,209 issued Sep. 23, 1997; Anders U.S. Pat. No. 5,665,793 issued Sep. 9, 1997; Kozak et al. U.S. Pat. No. 5,660,497 issued Aug. 26, 1997; Ishihara U.S. Pat. No. 5,607,621 issued Mar. 4, 1997; Bernard U.S. Pat. No. 5,592,330 issued Jan. 7, 1997; Brown et al. U.S. Pat. No. 5,586,787 issued Dec. 24, 1996; Wyckoff U.S. Pat. No. 5,576,097 issued Nov. 19, 1996; Hachey et al. U.S. Pat. No. 5,571,362 issued Nov. 9, 1996; Kozak et al. U.S. Pat. No. 5,516,227 issued May 14, 1996; Murayama et al. U.S. Pat. No. 5,424,006 issued Jun. 13, 1995; Hachey et al. U.S. Pat. No. 5,417,515 issued May 23, 1995; Zampa et al. U.S. Pat. No. 5,415,911 issued May 16, 1995; Bradshaw U.S. Pat. No. 5,268,789 issued Dec. 7, 1993; Hedblom U.S. Pat. No. 5,227,221 issued Jul. 13, 1993; Bailey et al. U.S. Pat. No. 5,064,272 issued Nov. 12, 1991; Dejaiffe U.S. Pat. No. 4,983,458 issued Jan. 8, 1991; Kuney U.S. Pat. No. 4,957,335 issued Sep. 18, 1990; Wood et al. U.S. Pat. No. 4,772,511 issued Sep. 20, 1998; Lange U.S. Pat. No. 4,758,469 issued Jul. 18, 1988; Lange U.S. Pat. No. 4,564,556 issued Jan. 14, 1986; Quon U.S. Pat. No. 4,546,042 issued Oct. 8, 1985; Trachtenberg U.S. Pat. No. 4,250,646 issued Feb. 17, 1981; Jack et al. U.S. Pat. No. 3,989,775 issued Nov. 2, 1976; Bingham U.S. Pat. No. 3,700,305 issued Oct. 24, 1972.

Each kind of visual enhancement material has something different to offer. Retroreflectors are especially effective when light which is impinging thereon is coming from the direction of the observer, as is the case, for example, of a nighttime driver when the light from his motor vehicle's headlights impinges on a traffic sign. Reflectors are especially effective when light which is impinging thereon is coming from a different direction from that of the observer and reflects in the direction of the observer, as is the case, for example, of a nighttime driver when the light from his motor vehicle's headlights misses a traffic sign, but the light from another source (or other sources) impinges on the traffic sign. Luminescents (e.g., phosphorescents, fluorescents and bioluminescents), which derive energy from one or more non-thermal sources and emit their own light, are especially effective under near dark or very dimly lit conditions. Typically, a conventional visual enhancer will be adapted to a particular application in terms of certain anticipated conditions and circumstances; nevertheless, the conventional visual enhancer may still prove deficient on a significant number of occasions or on a too frequent basis.

Moreover, there are certain situations wherein safety is only limitedly furthered by visual indication, albeit such visual indication is imbued with photoluminescent, photoreflective or retroreflective characteristic. For example, in many emergency situations lighting is obscured by smoke or chemicals, thus reducing or thwarting the effectiveness of the photoluminescent, photoreflective or retroreflective indicator. Floors, steps (e.g., stair treads), ladderways, aircraft landing areas, etc., are contexts wherein safety can be augmented by affording manual and/or pedal tactility of a particular indicator, in addition to visibility thereof.

SUMMARY OF THE INVENTION

In view of the foregoing, it is an object of the present invention to provide signs, markers and like articles which are optimally visible when impinged upon by light under a variety of deficient visual conditions.

Another object of the present invention is to provide such signs, markers and like articles which are readily appreciable both visually and tactilely.

A further object of the present invention is to provide methods of making such signs, markers and like articles.

It is another object of the present invention to provide compositions, for being applied to objects in liquid form as a coating therefor, wherein the applied compositions are optimally visible when impinged upon by light under a variety of deficient visual conditions.

A further object of this invention is to provide such compositions wherein the applied compositions are readily appreciable both visually and tactilely.

Another object of this invention is to provide methods of making such compositions.

A further object of the present invention is to provide auxiliary devices for adhering to objects so as to be optimally visible when impinged upon by light under a variety of deficient visual conditions.

It is another object of this invention to provide such auxiliary devices which are readily appreciable both visually and tactilely.

A further object of this invention is to provide methods of making such auxiliary devices.

In accordance with many embodiments of the present invention, an article or device comprises a particulate-containing matrix. The particulate-containing matrix includes: a resinous matrix material; a plurality of retroreflective spheres; a plurality of photoreflective pigments; and, a plurality of photoluminescent pigments. The resinous matrix material contains the retroreflective spheres, the photoreflective pigments and the photoluminescent pigments. The resinous matrix material has a matrix surface portion which is exposable to light from an exterior source. The retroreflective spheres generally are disposed protrudingly at the matrix surface portion. The photoreflective pigments and the photoluminescent pigments generally are disposed beneath the matrix surface portion. According to some such inventive embodiments, the particulate-containing matrix further includes a plurality of abrasive elements (e.g., abrasive grit such as but not limited to aluminum oxide, silica and carbide). The resinous matrix material contains the abrasive elements. The abrasive elements generally are disposed protrudingly at the matrix surface.

In accordance with many inventive embodiments, a method for visually enhancing an object comprises: providing a resinous matrix material which is in an uncured liquid state; mixing photoluminescent pigments in the resinous matrix material; providing photoreflective pigments; providing photoreflective pigments; mixing the photoluminescent pigments in the resinous matrix material; mixing the photoreflective pigments in the resinous matrix material; depositing the resinous matrix material on the object (the resinous matrix material being in an uncured liquid state, and containing the photoluminescent pigments and the photoreflective pigments); curing the resinous matrix material while the resinous matrix material is upon the object (the resinous matrix material being in an uncured liquid state, and containing the photoluminescent pigments and the photoreflective pigments); providing retroreflective spheres; and, distributing the retroreflective spheres onto (on top of) the resinous matrix material during (at some time or times in) the curing. According to some such embodiments, the inventive method further comprises providing abrasive elements, and distributing the abrasive elements onto (on top of) the resinous matrix material during (at some time or times in) the curing.

The inventive mixing, in the uncured liquid resinous matrix material, of the photoluminescent pigments and the photoreflective pigments, can be performed together and/or separately. That is, the photoluminescent pigments and the photoreflective pigments can be mixed with each other and then aggregately mixed into the uncured liquid resinous matrix material; and/or, the photoluminescent pigments and the photoreflective pigments can be sequentially or alternatingly mixed, in any order, directly into the uncured liquid resinous matrix material.

The present invention provides a versatile, uncomplicated visual enhancer which efficaciously combines the attributes of reflection, retroreflection and luminescence. The inventive principles are practically universal in application, since diverse lighting conditions are accounted for by the invention. This invention affords continued visibility following illumination with visible light, as well as improved visibility under variously illuminated or nonilluminated conditions.

Inventively featured is a blend of retroreflective, reflective and luminescent pieces contained in a resinous matrix characterized by a unified, single-matrix configuration. The inventive matrix embraces retroreflective, reflective and luminescent properties in the visible range of frequency. The retroflective pieces are protrusively distributed in the matrix. The reflective and luminescent pieces are nonprotrusively distributed in the matrix. The present invention's combined, discrete implementation of photoluminescent material entities, photoreflective material entities and retroreflective material entities has not been observed elsewhere.

According to many inventive embodiments, the three kinds of microentities—viz., retroreflective spheres, photoreflective fragments and photoluminescent fragments—are densely dispersed throughout the matrix, with the retroreflective spheres predominating and partially protruding at the top surface of the matrix (i.e., the surface facing the light source). In typical inventive practice, the inventive matrix is effectively stratified wherein the retroreflective elements define an upper stratum, and the photoreflective elements and photoluminescent elements define a lower stratum.

When light hits the inventive particulate-containing matrix, the three kinds of microentities respond to the light in collective and complementary fashion, thus rendering the particulate-containing matrix highly visible under poorly lit conditions. The photoluminescent elements store visible light from previous illumination events. In addition, the combined implementation of the three kinds of microentities serves to diversify the angularity of reflection of the matrix; in other words, light which hits the matrix will reflect back to the source as well as reflect in numerous "non-retro" directions.

The terms "retroreflective" and "photoreflective" as used herein are distinguishable. As used herein, the term "retroreflective" refers to reflection of light off a surface: in a retrodirectional way. A retroreflective object is a specially contrived object which receives a light ray and turns the light ray around, sending the light ray back to the source of the light ray. The term "photoreflective" (or "reflective") has been commonly used, in a general sense, to connote reflection of light off a surface. As used herein, the term "photoreflective" is meant to be differentiated from the term "retroreflective." That is, a photoreflective object, as intended herein, is one which reflects light in an ordinary way, i.e., not in a way which is retrodirectionally contrived. A "photoreflective" object, as intended herein, is characterized by lacking the retrodirectional quality of a "retroreflective" object. Typically, a "photoreflective" object will be so structured or configured as to generally entail the normal, uncomplicated effect of direct reflection from the object's exterior surface, wherein the angle of light incidence equals the angle of light reflection with respect to such surface. Hence, as intended herein, *"retroreflectors" and "photoreflectors" are mutually exclusive.

Many inventive embodiments utilize two types of photoreflective material, viz., "diffusely" reflective material and "specularly" reflective material. Utilization of both types of pigments enhances the inventive visual (especially, retroreflective) effect by angularly diversifying the reflection of light. Some inventive embodiments utilize reflective pigments which are diffuse reflective pigments only or which are specular reflective pigments only.

Typical embodiments of the present invention combine at least the three attributes of retroreflectivity, photoreflectivity and photoluminescence. Such embodiments are useful for affording visual cues to the observer in a variety of applications, such as the following: emergency signage for location of exits, pathways, escape routes, etc.; ladders; steps; roadway markings (e.g., for poorly lit roadways); unlit disabled vehicles; damaged aircraft (e.g., lacking onboard lighting); aircraft landing aids. These and other demarcation purposes provide visual cues with or without impingement by emergency lighting or headlights (as in the case of roadway demarcation), and also tactile cues for use in emergency situations where lighting is obscured by smoke.

Some inventive embodiments afford additional versatility by combining the attribute of abrasiveness (frictionality)

with the three attributes of retroreflectivity, photoreflectivity and photoluminescence. Hence, such inventive embodiments are "visual-tactile," combining visual enhancement with tactile enhancement. According to such inventive embodiments, frictional (abrasive) elements are protrusively distributed in the matrix at its surface. Thus, the inventive matrix typically contains two kinds of particulate matter which are partially exposed (i.e, retroreflective elements and abrasive elements) and two kinds of particulate matter which are not exposed (i.e., photoreflective elements and photoluminescent elements); in effect, the inventive matrix is stratified wherein the retroreflective elements and abrasive elements define an upper stratum, and the photoreflective elements and photoluminescent elements define a lower stratum.

The inventive quality of tactility is useful, for instance, in the following applications: on floors (for non-slippage as well as for imparting cues by foot-feel); on ladderways (for hand tactility as well as foot tactility); and,on aircraft landing areas (where non-skid properties contribute to safety of personnel and equipment, particularly under wet and oily conditions common to such areas as aircraft carrier landing decks and helipads).

The present invention can be embodied in various modes, including the following: (i) an applique tape having robust adhesive qualities; (ii) a resinous liquid, conventionally applied as a paint or coating; and, (iii) a flat or formed composite object (or group of objects) which is structurally sound, such as a plate, lettering or shaped signage (e.g. directional arrows). Applique embodiments are particular useful for effecting "quick-fix" marking of ship decks and other structures (e.g. plylons). Inventive articles and devices can serve to communicate via characters, symbols, figures, pictures, arrows or other representative means. There are many possible embodiments and applications for inventive articles and devices—for instance, a polymeric cover for a fire extinguisher; or, attachable (e.g., attachable to a ladderway) nonskid stair treads (e.g., made of a material such as a polyurethane matrix).

Through retroflection, reflection and photoluminescence, the inventive articles, devices and compositions improve visual detection thereof in the absence of normal lighting, or in diminished lighting, or in complete darkness. The present invention admits of numerous applications, some of which are aforementioned. A notable application of this invention involves rescue missions. The portable lighting utilized by rescue crew may be unavailable or limited. Such lighting can be inventively supplanted, particularly by the efficient photoluminescence inventively provided.

Moreover, inventive embodiments having non-skid attributes are especially valuable when total visual obfuscation is brought about by smoke or other visual impairment. Such inventive embodiments impart information as to direction, object identification and location by tactile feel. In addition, such inventive embodiments afford increased safety from slippage, especially under wet and/or oily conditions.

Thus, the inventively combined effect of retroflection, reflection, fluorescence and tactility provides clearer cues for emergency escape, demarcation, object-location, etc., under extreme conditions of darkness, visual obfuscation and/or slipperiness. Such conditions are prevalent in diverse emergency and damage-control situations, such as associated with domestic building fires or exigencies aboard ships at sea. The present invention's consolidation of the four attributes of retroflection, reflection, fluorescence and tactility is believed to be currently unavailable in the art.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawing, wherein like numbers indicate the same or similar components, and wherein.

DETAILED DESCRIPTION OF THE INVENTION

Figure 1:
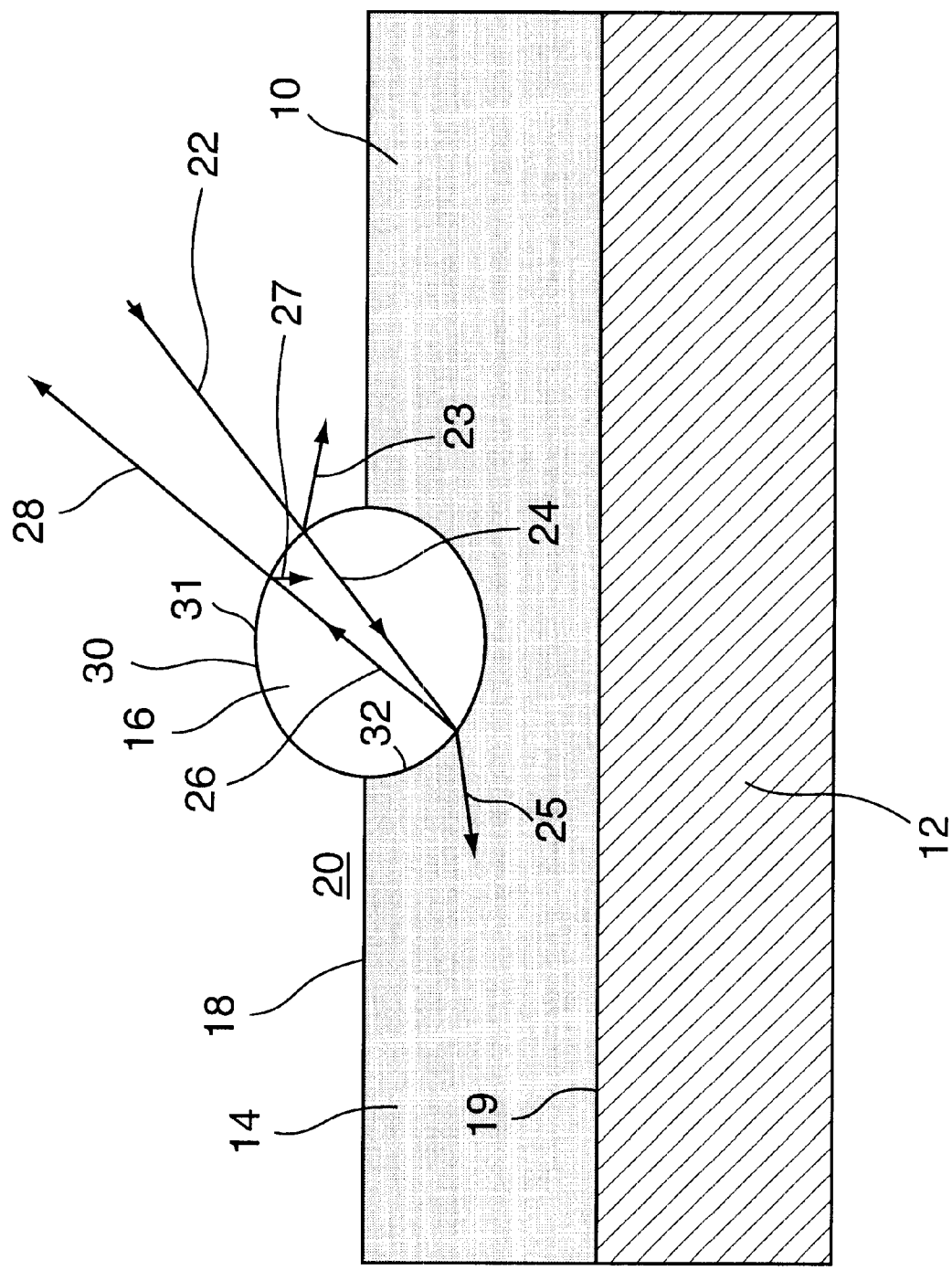
FIG. 1 is a diagrammatic cross-sectional elevation view of an inventive embodiment, illustrating retroreflection according to the present invention.
Figure 2:
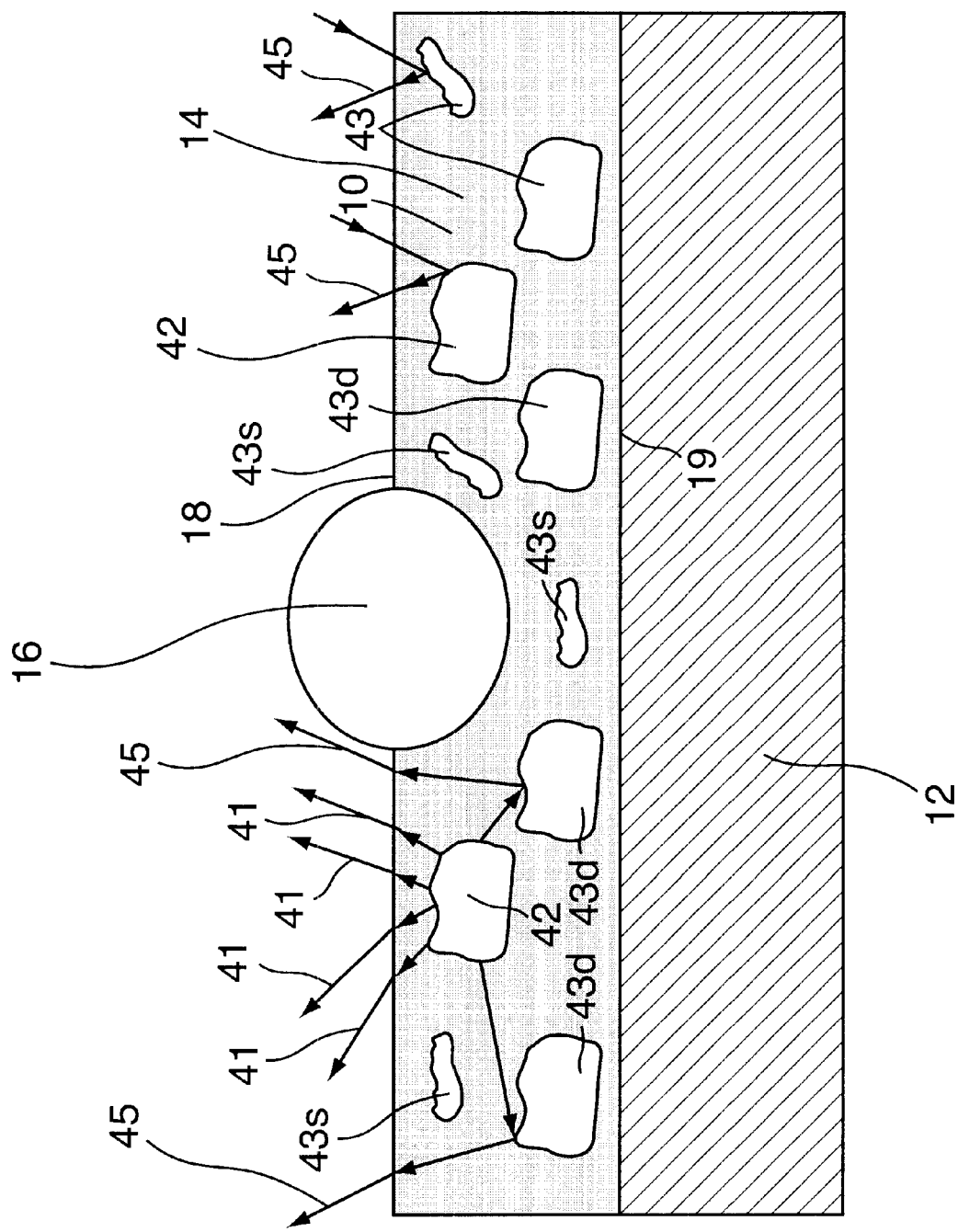
FIG. 2 is a diagrammatic cross-sectional elevation view (similar to the view in FIG. 1) of the inventive embodiment shown in FIG. 1, illustrating the combination of retroreflection, reflection and luminescence according to the present invention.
Figure 3:
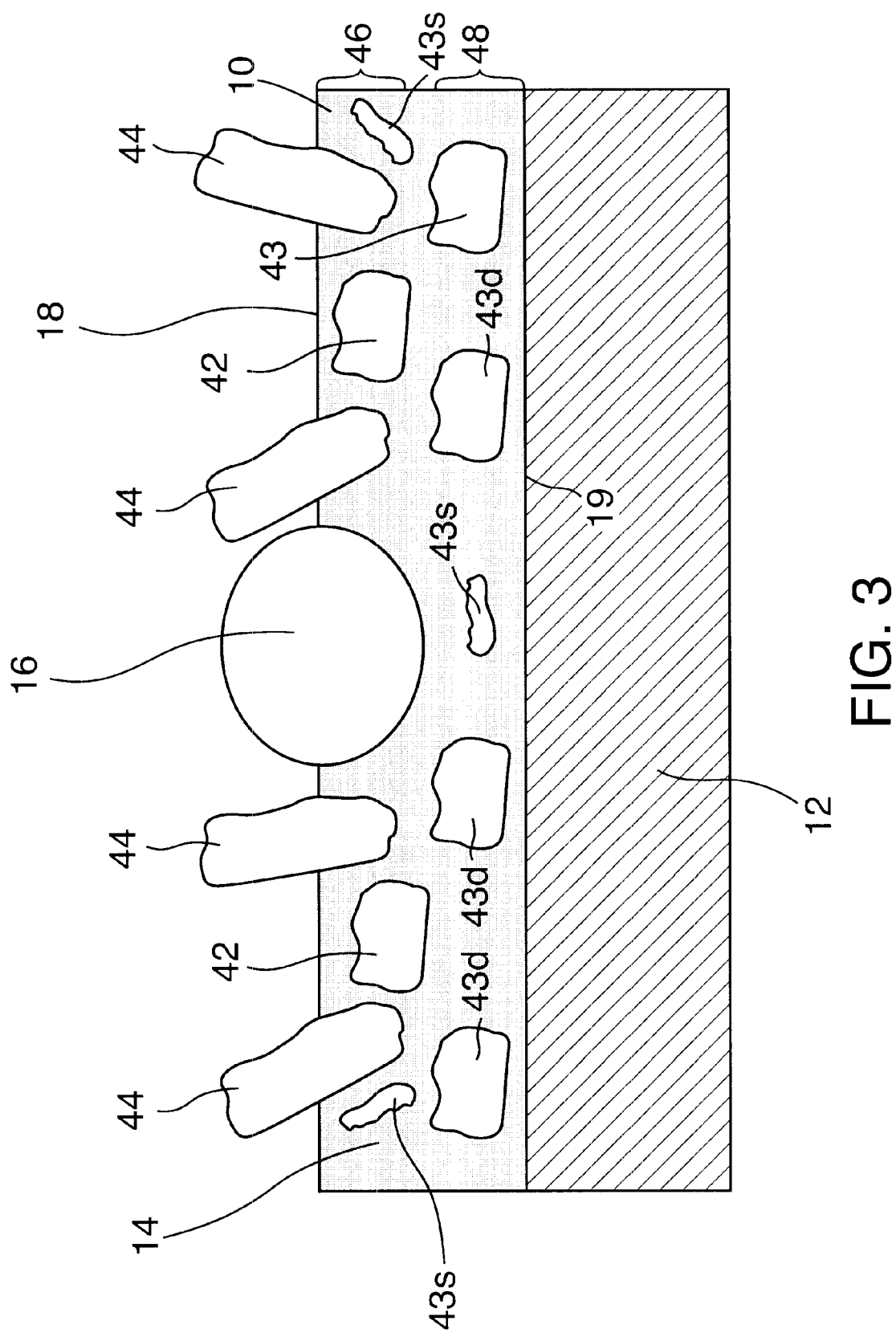
FIG. 3 is a diagrammatic cross-sectional elevation view (similar to the view in FIG. 1 and FIG. 2) of the inventive embodiment shown in FIG. 1 and FIG. 2, illustrating the combination of retroflection, reflection, luminescence and surface-contact roughness according to the present invention.

Referring now to FIG. 1, inventive particulate-containing matrix 10 coats or covers substrate 12. Inventive particulate-containing matrix 10 comprises an optically transparent resinous matrix material (resin) 14 and a multiplicity of glass (or plastic or ceramic) retroreflective spheres 16. Spheres 16 are approximately spherical or spheroidal, bead-like or pellet-like objects, typically on the order of one to two millimeters in diameter, which are partially exposed at interfacing matrix surface 18. It is generally not required inventive practice that spheres 16 be perfectly spherical; rather, a retroreflective "sphere," as the term is used herein, has a perfectly spherical shape or has a shape similar to or approximative of that of a perfect sphere, such that the "sphere" is retroreflectively effective. Indeed, sphere 16 is shown in FIG. 1 through FIG. 3 to be somewhat flattened or oblately spheroidal.

Interfacing matrix surface 18 (the upper surface of matrix material 14 as shown in FIG. 1) defines an interface between matrix material 14 and the environment 20. Interfacing matrix surface 18 is subjected to the impinging light. Matrix material 14 also has noninterfacing matrix surface 19 (the lower surface of matrix material 14 as shown in FIG. 1), which is contiguous with substrate 12.

A retroreflective object ("retroreflector") is one which has the property of reflecting a substantial portion of impinging light back generally in the direction from which the light came. Typically, a retroreflector comprises a sphere (or "microsphere") made of glass or plastic. Retroreflection occurs by the tandem action of refraction of the light through the upper surface of the sphere, reflection from the lower inside surface of the sphere (or bead), and subsequent refraction of the light as it exits from the upper surface of the sphere, back approximately in the direction from which the impinging light came.

Retroreflectors are known in the art, as exemplified by some of the aforenoted references. Familiar to the ordinarily skilled artisan are retroreflective microspheres comprising a glass or plastic material; see, e.g., aforenoted Kozak et al. U.S. Pat. No. 5,660,497; Kozak et al. U.S. Pat. No. 5,516,227; Bingham U.S. Pat. No. 3,700,305 issued Oct. 24, 1972. Also familiar to the ordinarily skilled artisan are retroreflective microspheres comprising a ceramic material, such as zirconia, alumina, silica and titania; see, e.g., aforenoted Palazzotto U.S. Pat. No. 5,822,120; Hedblom U.S. Pat. No. 5,777,791; Wood et al. U.S. Pat. No. 4,772,511; Lange U.S. Pat. No. 4,758,469; Lange U.S. Pat. No. 4,564,556. Because of the superior durability of ceramic retroreflectors, inventive practice for some applications may preferably implement ceramic retroreflectors rather than glass or plastic retroreflectors.

For purposes of considering the reflection and refraction of electromagnetic radiation (light energy), each sphere 16 can be conceived to have an exterior sphere surface 30 having two opposite sides, viz., a surface outside 31 and a surface inside 32. Incident light 22 is sourced, e.g., from emergency lights, headlights or even weak ambient light.

Some of source incident light 22 is initially reflected by outside surface side 31 directly to environment 20, as indicated by primary reflected light 23. However, sphere 16 also retroreflects incident light 22. As indicated by primary refracted ray 24, the rest of incident light 22 is initially transmitted through exterior sphere surface 30 and refracted within sphere 16. According to this retroreflective phenomenon, incrementally decreasing portions of incident light 22 are sequentially refracted within sphere 16, such as represented by the sequence of primary refracted ray 24, followed by primary reflected-refractive ray 26, followed by secondary reflected-refractive ray 27.

As indicated by primary reflected-refractive ray 26, part of primary refracted ray 24 is retroreflected (back-reflected) off surface inside 32 so as to travel obliquely but nearly parallel with respect to source incident light 22. Another part of primary refracted ray 24 passes through exterior sphere surface 30 and continues outside of sphere surface 30 and within matrix material 14, as indicated by secondary refractive ray 25; thus, the transmission of light is imparted, via secondary refractive ray 25, to the optically transparent resinous matrix material 14 medium.

As indicated by primary reflective ray 28, a portion of reflected-refractive ray 26 passes through exterior sphere surface 30 and continues outside of sphere surface 30. Another portion of primary reflected-refractive ray 26 is reflected off surface inside 32, as indicated by reflected-refractive ray 27.

As perceived by the observer, primary visible reflective ray 28 is the main source of "brightness" deriving from retroreflective sphere 16. Although not explicitly illustrated in FIG. 1, it is readily envisioned that secondary reflected-refractive ray 27 can behave in an analogous manner as does primary refracted ray 24. In other words, a portion of reflected-refractive ray 27 will retroreflect off of surface inside 32 as a reflected-refractive ray, while a portion of reflected-refractive ray 27 will pass through exterior sphere surface 30 and continue as a refractive ray outside of sphere surface 30 and within matrix material 14. A portion of the reflected-refractive ray will reach environment 20 as a secondary visible reflective ray, while a portion of the reflected-refractive ray will be reflected off surface inside 32 as a tertiary reflected-refractive ray. Thus, the retroreflective cycle, initiating with an incident light ray and an associated primary retroreflective phase, will repeatedly manifest in incrementally diminishing fashion in secondary, tertiary, etc., retroreflective phases.

However, retroreflective spheres 16 are not the only small entities present within matrix material 14. With reference to FIG. 2, the propagation of visible light rays is beneficially multiplied as a consequence of two other kinds of particulate material which are numerously dispersed throughout matrix material 14. That is, the light which reaches layer 10 is acted upon by three kinds of particulate entities contained within matrix material 14, namely: (i) retroreflective spheres (e.g., beads or pellets) 16; (ii) photoluminescent pigments (e.g., fragments, pieces or platelets) 42; and, (iii) reflective pigments (e.g., fragments, pieces or platelets) 43.

Generally, spheres 16 are superficially distributed throughout matrix material 14, so as to be partially exposed at interfacing matrix surface 18. Generally, photoluminescent pigments 42 and reflective pigments 43 are more deeply distributed throughout matrix 14, completely beneath interfacing matrix surface 18; pigments 42 and 43 are randomly dispersed and variously disposed, beside and below spheres 16. Photoluminescent pigments 42 and reflective pigments 43, generally in inventive practice, are each about 20 to 30 microns long or less across its greatest dimension, more typically about 25 long or less across its greatest dimension.

An advantageous multiplier effect results from the light 9 interaction among the three particulate entities 16, 42 and 43 which are contained by matrix material 14. Light synergistically "bounces" among retroreflective spheres 16, photoluminescent pigments 42 and reflective pigments 43, ultimately amplifying the visual impact of inventive matrix 10. Photoluminescent pigments 42 and reflective pigments 43 serve to maximize the retroreflective efficiency of inventive matrix 10.

To elaborate, some light, such as indicated by reflected-refractive ray 25 FIG. 1, escapes spheres 16 and reacts with photoluminescent pigments 42. Some light, again such as indicated by reflected-refractive ray 25 in FIG. 1, escapes spheres 16 and reacts with reflective pigments 43. Some light has not been originally affected by spheres 16, such light having found a "gap" between spheres 16, thus having proceeded directly to either photoluminescent pigments 42 or reflective pigments 43, situated below interfacing matrix surface 18. Some light which has reacted with reflective pigments 43 proceeds to and reacts with photoluminescent pigments 42; conversely, some light which has reacted with photoluminescent pigments 42 proceeds to and reacts with reflective pigments 43.

As exemplified by photoluminescent rays 41, visible photoluminescent energy is emitted by photoluminescent pigments 42. Recent advances in luminescent pigments have resulted in longer, stronger luminescent glows. See, e.g., aforenoted references Murayama et al. U.S. Pat. No. 5,686,022 and Murayama et al. U.S. Pat. No. 5,424,006, which pertain to a phosphorescent pigment having the trademark "LumiNova" and developed by Nemoto & Co., Ltd. of Tokyo, Japan.

Pigments of photoluminescent materials such as europium aluminate, or strontium aluminate: europium, are demonstrated in the art to retain effective luminescence for at least a normal dark (night) cycle. Europium (a metallic element having an atomic number of 63) is a rare earth element. Instead of europium, another rare earth element (i.e., any of the metallic elements having an atomic number between fifty-seven and seventy-one inclusive) can be used in these or similar formulations of the form europium aluminate or strontium aluminate: europium. These and other known photoluminescent materials can be inventively utilized to enhance the optical detection of objects such as characterized by the construct described with reference to FIG. 1 through FIG. 3. Phosphorescent, fluorescent and bioluminescent materials are three main categories of photoluminescent materials with which the ordinarily skilled artisan is well acquainted.

In addition, as exemplified by photoreflective rays 45, light is internally reflected by reflective pigments of two types—viz., diffuse reflective pigments 43d and specular reflective pigments 43s—which are randomly distributed throughout matrix material 14. For a discussion of diffuse reflective pigments versus specular reflective pigments, see, e.g, aforenoted Hachey et al. U.S. Pat. No. 5,750,191; Hachey et al. U.S. Pat. No. 5,571,362; Hachey et al. U.S. Pat. No. 5,417,515.

Diffuse pigments, generally, are fine, light-colored particles which are fairly uniform in size. In inventive practice, the diffuse pigments 43d will tend to be oriented in many different directions; hence, light impinging upon matrix material 14 will be reflected through matrix material 14 in many different directions by diffuse pigments 43d. There are many diffuse pigments known in the art which are suitable for inventive practice, such as titanium dioxide and barium sulfate.

Specular pigments, generally, are small, thin platelets. In inventive practice, the specular pigments 43s will tend to be oriented in approximately the same direction, parallel to the plane defined by interface 12; hence, light impinging upon matrix material 14 will generally be reflected through matrix material 14 in approximately the same direction by specular pigments 43s. Typically, a specular pigment exhibits a "leafing" characteristic. Known in the art which are many specular pigments which would be suitable for inventive practice, such as aluminum flake, quartz flake, mica, pearlescent pigments and nacreous pigments.

Not all of the specular pigments 43s will align in horizontal planar fashion, however. Specular pigments 43s near spheres 16 will tend to situate at various angles proximate spheres 16, thus possibly enhancing the photoreflectivity of spheres 16. Furthermore, specular pigments 43s near abrasive elements 44, shown in FIG. 3, will tend to situate at various angles proximate abrasive elements 44, thus increasing the angular diversity of the overall reflectivity of matrix 10.

Moreover, as shown in FIG. 2, photoluminescent pigments 42 themselves are light sources. Some of the luminescent energy from photoluminescent pigments 42 is internally reflected into and through transparent resinous matrix material 14 by the associated light-colored diffuse pigments 43d. In this manner, diffuse pigments 43d further reinforce the optical cues afforded by this invention, particularly when the present invention is impinged by emergency lighting or headlights.

Reference now being made to FIG. 3, the addition of abrasive elements 44 augments the functionality of inventive matrix 10. Abrasive elements 44 are abrasive particles or addends such as aluminum oxide, silicas, carbides or other tactility-imparting grit or non-skid additives which provide surface roughness. There are many varieties available of tactility-imparting grit-like material which would suitably serve as abrasive elements 44 in inventive practice.

As shown in FIG. 3, visibility (or visual enhancement) is provided by the combined effect of spheres 16, photoluminescent pigments 42 and reflective pigments 43. Tactility (or tactile enhancement) is provided by abrasive elements 44, particularly in terms of tactile feel qualities and non-slip/non-skid qualities.

Inventive matrix 10 generally describes a layered or stratified configuration wherein spheres 16 and abrasive elements 44 generally define or occupy a superficial layer 46, while photoluminescent pigments 42 and reflective pigments 43 generally define or occupy a subsurface layer 48. Layers 46 and 48 are not discrete layers; rather, layer 46 entails the matrix 14 disposition of partially embedded, partially protrusive elements 16 and 44, whereas layer 48 entails the matrix 14 disposition of entirely embedded elements 42 and 43.

According to preferred inventive practice, the matrix 14 resin is translucent. Many resinous materials (e.g., epoxies, polyurethanes, silicones 1 vinyls and acrylics) in fact are translucent. In the light of-this disclosure, it is apparent to the ordinarily skilled artisan who practices this invention that optimization of the various concentrations of ingredients (i.e., spheres 16, abrasive elements 44, photoluminescent pigments 42 and reflective pigments 43) in the resinous matrix 14 binder is in accordance with the desired performance associated with specific conditions. Photoluminescent pigments 42 and reflective pigments 43 should be optimized for photoreactive performance. Abrasive elements 44, if included in matrix 10, should be optimized for tactile performance.

Generally, in inventive practice, those embodiments which include abrasive elements 44 do not necessitate a relative abundance thereof. Because of the opaqueness of the abrasive elements (e.g., tactility-imparting grit-like material) 44, and the requirement for only limited surface coverage for provided effectiveness of abrasive elements 44, the concentration of abrasive elements 44 may be as little as one percent (1%) by volume (i.e., the volume of inventive matrix 10).

Whether embodied as an applique, coating or cast product, the present invention can operate quite effectively even when retroreflective spheres 16 completely or nearly completely overlay interfacing matrix surface 18 of matrix material 14. Since the retroreflective spheres 16 are optically translucent, their virtual blanketing of matrix material 14 at interfacing matrix surface 18 will not significantly reduce the photoluminescence of inventive matrix 10.

A preferred inventive construction involves a kind of double layered/stratified arrangement (such as shown in FIG. 3) whereby retroreflective spheres 16 are densely and projectingly situated in matrix material 14 at interfacing matrix surface 18, while photoluminescent pigments 42 and reflective pigments 43 abound in matrix material 14 below interfacing matrix surface 18. If the inventive embodiment includes abrasive elements 44, these are more sparsely and projectingly situated in matrix material 14 at interfacing matrix surface 18. According to typical inventive practice, matrix 14 below interfacing matrix surface 118 is heavily pigmented with photoluminescent pigments 42 and: reflective pigments 43 at about a two-to-one (2:1) ratio, by volume, of photoluminescent pigments 42 to reflective pigments 43, with resin matrix 14 loadings as high as about seventy percent (70%) solids (i.e., all solid entities, including photoluminescent pigments 42 and reflective pigments 43, and—if contained in the original liquid resinous matrix material 14—retroreflective spheres 16 and abrasive elements 44), by volume, depending upon the matrix material used (for example, a thermoset material or a solvent-based coating material).

The percentage of solids de;pends upon whether the matrix material is thermoset or solvent-based (like in a paintable composition) because solvent evaporates upon cure. The resin remains as the "glue" to hold everything together, and the practitioner will generally wish to have around 30% of the solidified product be the "glue". Therefore, in anticipation of a degree of evaporation, a solvent-based matrix material should start out with a lower percentage of solids than would a thermoset matrix material. In either situation, the objective is to attain at least 30% by volume of resin (resinous matrix material) in the cured inventive matrix. The amount of volume of all pigmerits, spheres and abrasives which are contained in the composition (excluding spheres and abrasives dispersively added to the paint-like composition during cure) should be no more than (and perhaps less than) 70% by volume. In a solvent-based paint-like composition, the volume includes the solvent plus the solids contained therein.

Examples of a thermoset resin are an epoxy or a polyester-based resin which, upon solidifying (curing through crosslinking of the polymer backbones), results in very little volume change as compared with a solvent-type paint-like composition. The inventive practitioner would use a thermoset composition for such forms as a moldable/castable resin, a trowelable decking, a filler-like body putty, etc. A solvent-based paint-like composition would be more useful where large areas or complex shapes need to be treated conveniently. The selected differences among the volumes of solid in the resinous matrix material are in part attributable to the abiding principle that, in the final product, it is desirable to achieve at least 30% matrix material, such matrix material acting as a "glue" which "holds everything together."

Figure 4:
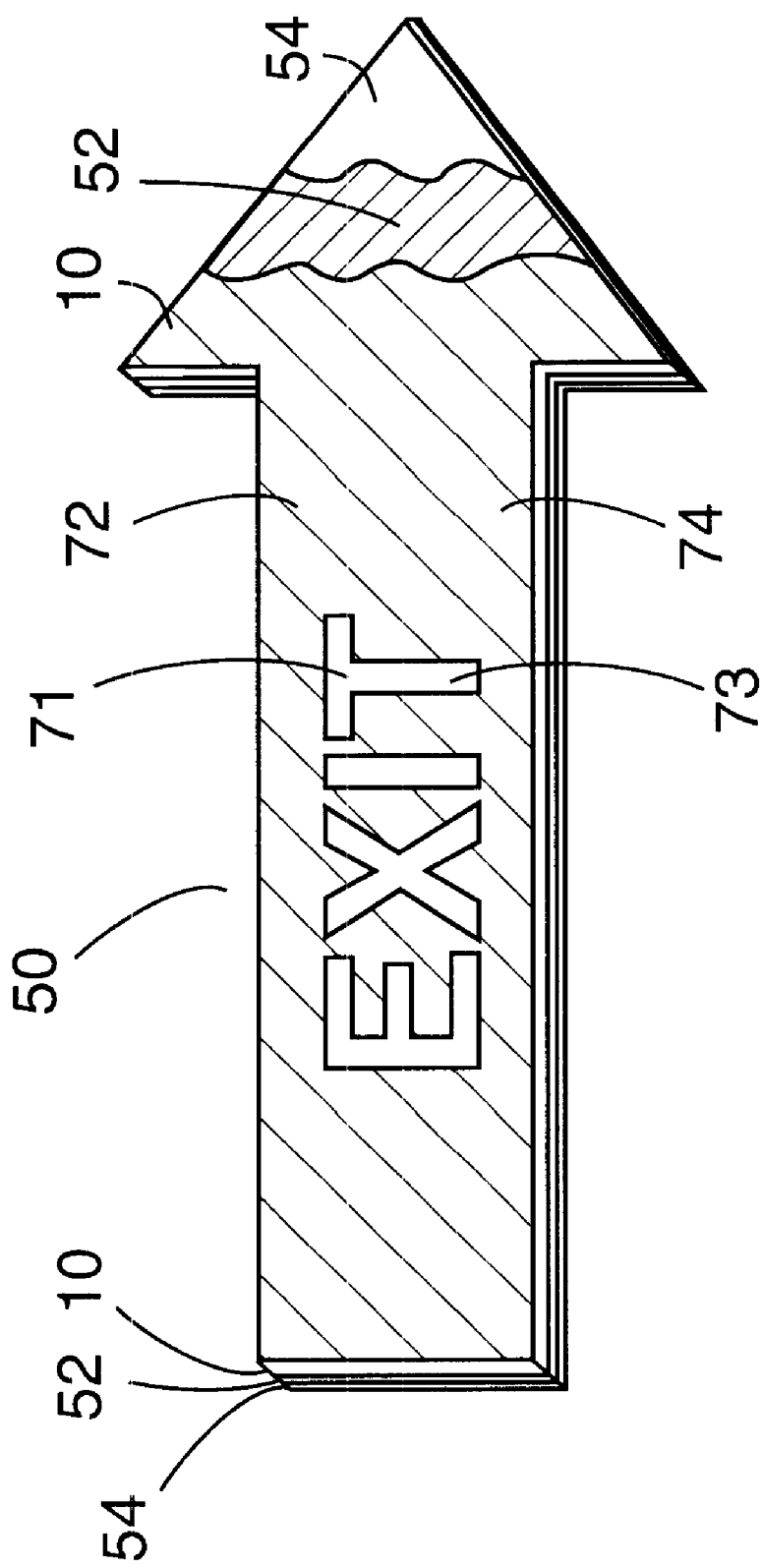
FIG. 4 is a diagrammatic cutaway perspective view of an inventive embodiment as an applique-type device.
Figure 4A:
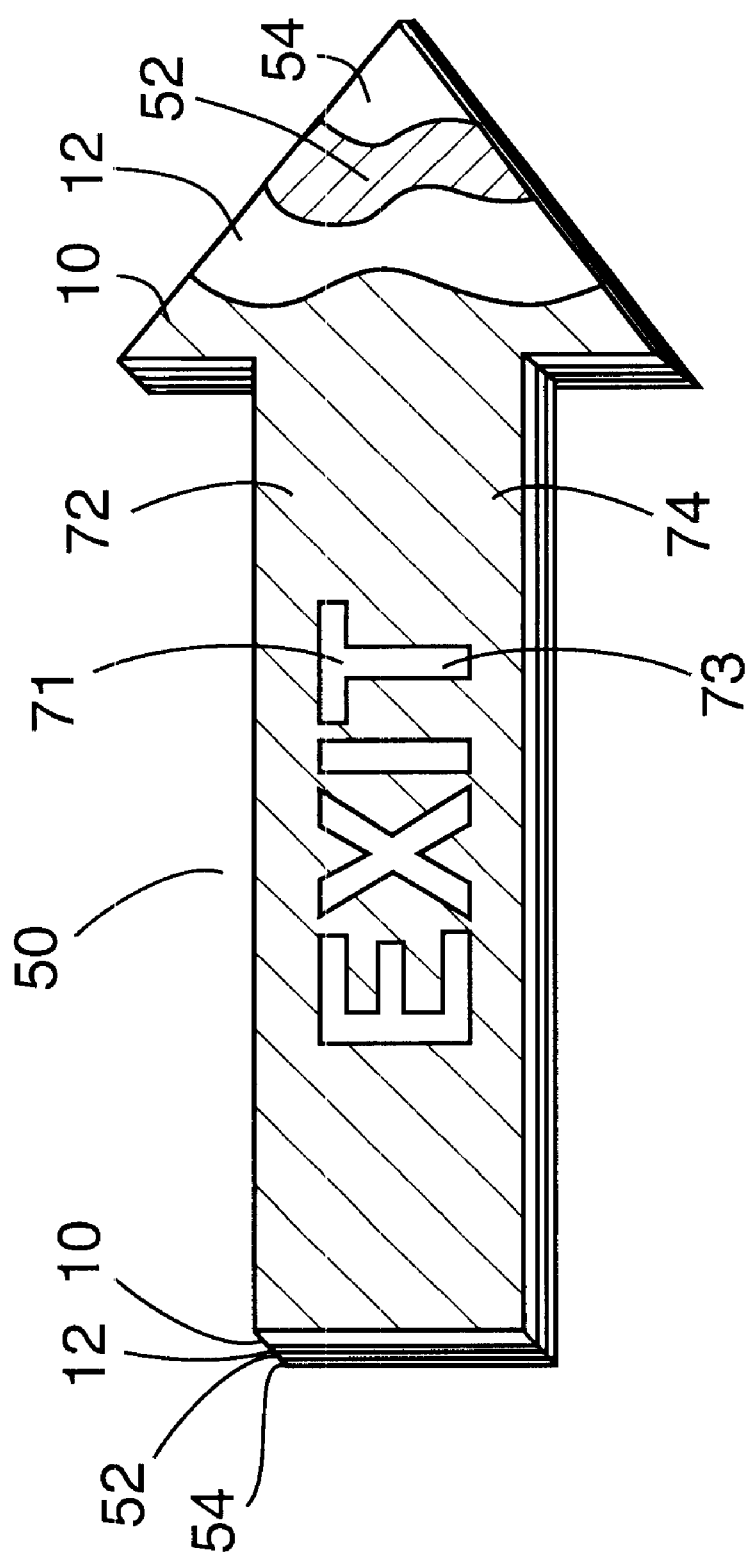
FIG. 4A is a diagrammatic cutaway perspective view, similar to the view shown in FIG. 4, of a similar but distinguishable inventive embodiment as an applique-type device.

With reference to FIG. 4 and FIG. 4A, inventive applique 50 is an adhesive-backed, tape-like applicable device which includes inventive matrix 10 and adhesive material 52. As shown in FIG. 4, adhesive material 52 is adjacent to non-interfacing matrix surface 19. As shown in FIG. 4A, adhesive material 52 is adjacent to substrate 12. Some inventive applique 50 embodiments are adhesive tapes which are rotatably dispensable like certain types of conventional adhesive tape.

For "peel-and stick" application of applique 50, some such inventive embodiments also include a thin removable sheet 54, wherein the adhesive material 52 layer (e.g., adhesive foam) is adjacently interposed between the matrix 10 layer and the sheet 54 layer (such as shown in FIG. 4), or is adjacently interposed between the substrate 12 layer and the sheet 54 layer (such as shown in FIG. 4A). In the larger layered/stratified construct of inventive applique 50, matrix 10 represents a layer thereof; furthermore, matrix 10 itself generally describes a layered/stratified configuration in accordance with the distribution therein of the assorted particles, such as illustrated by superficial layer 46 and subsurface layer 48 in FIG. 3.

Inventive appliques 50 are sized and shaped appropriately to the end-use. Practically any configuration of inventive applique 50 can be realized for conferring the desired communication. Examples of inventive appliques 50 include letters, numbers, arrows, identifiable pictorial representations, symbols, and other forms of signage. Manufacture of inventive applique 50 can be accomplished by conventional layering/melting/pressing lamination techniques and procedures.

Figure 5:
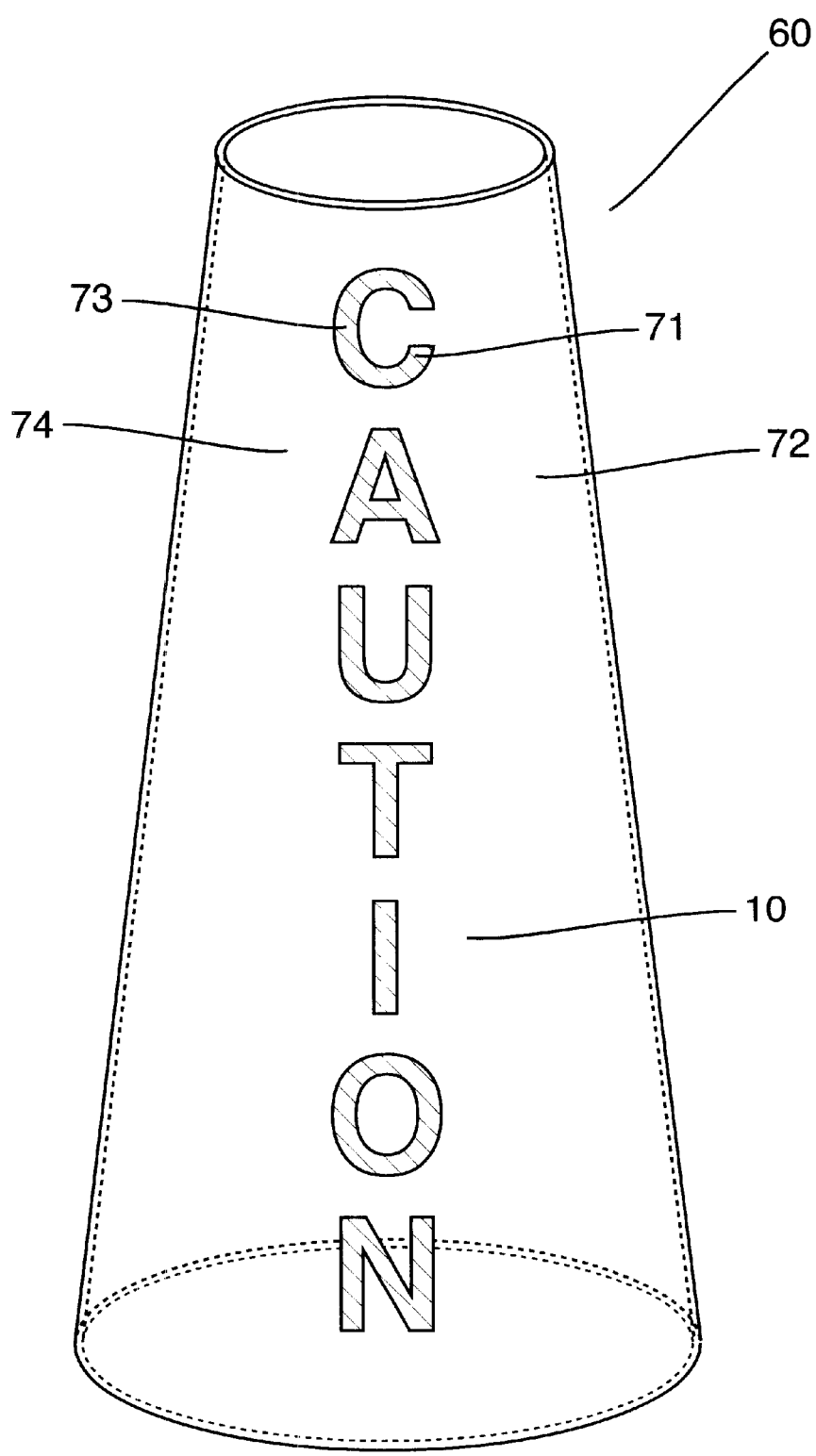
FIG. 5 is a diagrammatic perspective view of an inventive embodiment as a molded/casted article.
Figure 5A:
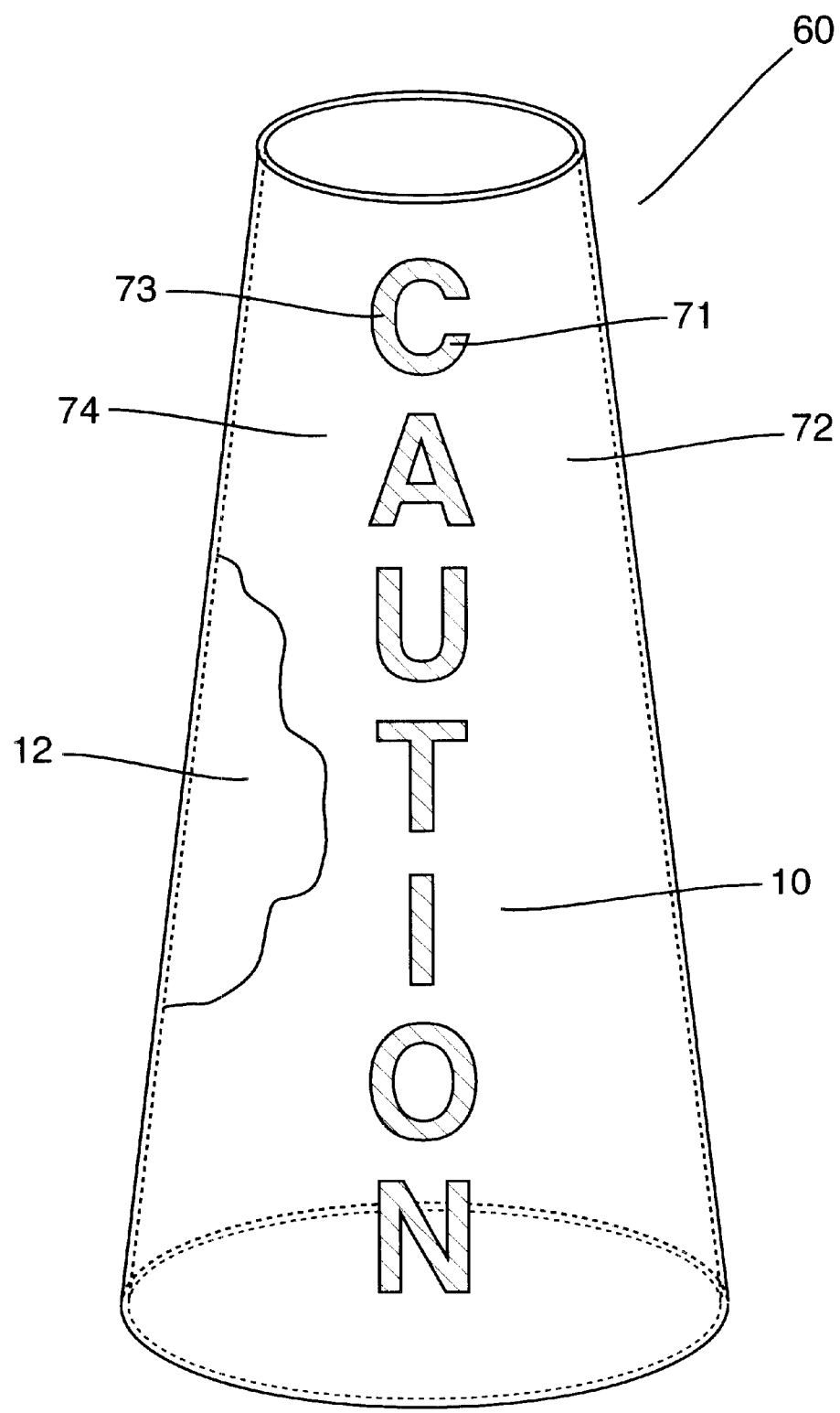
FIG. 5A is a diagrammatic perspective view,,similar to the view shown in FIG. 5, of a similar but distinguishable inventive embodiment as a molded/casted article.

Now referring to FIG. 5 and FIG. 5A, inventive composite shaped object 60 is formed as a castable, moldable product which is structurally viable. Again, practically any configuration of inventive composite shaped object 60 can be realized for conferring the desired communication. Inventive objects 60 can comprise and/or display letters, numbers, arrows, identifiable pictorial representations, symbols, or other forms of signage.

Inventive objects 60 such as shown in FIG. 5 comprise an inventive matrix 10 which itself is formed as a castable/moldable, structurally viable product. Inventive object 60 is casted or molded using an optically clear structural resin as the resinous matrix material 14. Suitable thermosetting resins include acrylic, polyester, epoxy and urethane. Among others, a suitable thermoplastic resin is polyethylene, which is a simple and inexpensive resinous material.

Inventive objects 60 such as shown in FIG. 5A comprise matrix 10 and a pre-existing structural body (typically, one which has been casted or molded) which represents the substrative structural portion 12 of inventive object 60. Matrix 10 can be either: (i) overlayed upon substrative structural portion 12 as an applied coating; or, (ii) casted/molded and then retrofit onto substrative structural portion 12 as a superposed structure.

Plastics generally fall into two categories., viz., thermoplastic resins and thermosetting resins. Thermoplastic resins can be heated and softened repeatedly without incurring basic alteration in characteristics. By comparison, thermosetting resins, once set at a critical temperature, cannot be resoftened and reworked. Most fabrication methodologies working with plastic (e.g., casting, molding and extruding) involve heat; therefore, thermosetting materials must be formed properly and accurately during any thermal cycling which exceeds the critical temperature. Essentially according to typical extrusion techniques, thermoplastic materials are heated and forced through a die to provide the desired cross-section.

There are various basic inventive approaches to fabrication of an inventive applique. According to a first basic inventive approach, thermoplastic material is extruded to desired shape, and serves as the substrate for the resinous matrix material. The pigmented resinous matrix material is applied as a coating to the extruded thermoplastic material. In frequent inventive practice, retroreflective spheres (and tactile elements, if applicable) are dispersed during curing upon the pigmented resinous matrix material coating. A finished form according to the first basic approach is exemplified in FIG. 4A.

According to a second basic inventive approach, the pigmented resinous matrix material itself is extruded to desired shape, thereby obviating the need for a substrate. The retroreflective spheres (and tactile elements, if applicable) are dispersed during curing upon the extruded pigmented resinous matrix material. A finished form according to the second basic approach is exemplified in FIG. 4.

Generally, the second basic approach to the inventive extrusion process is feasible as long as the retroreflective spheres are added to the product while it is still in the plastic (soft) stage. The inventive practitioner would want to keep the photoexposure/interface surface (e.g., the upper hemispheric surface) of the retroreflective spheres uncoated by the extrusion resinous mixture so as to optimize their retroreflectivity properties. Thus, the retroreflective spheres could be pressed into the still soft matrix during the extrusion process. During the extrusion process, tactile grit could also be pressed (along with the retroreflective spheres) into the still soft matrix, if so desired; however, the grit will function even if somewhat coated as long as the grit extends through the photoexposure/interface surface during the extrusion process.

Along similar lines, there are various basic inventive approaches to fabrication of a moldable/castable product. According to a first basic inventive approach, a thermosettable material is cast/molded; then, during cure, the pigmented resinous matrix material is applied as a coating to the molded thermosettable material, which serves as a structural substrative portion of the product. A finished form according to the first basic approach is exemplified in FIG. 5A.

According to a second basic inventive approach, the pigmented resinous matrix material itself is cast/molded as the structural entity, thereby obviating the need for a substrate. A finished form according to the second basic approach is exemplified in FIG. 5. The second basic approach to making a moldable/castable product is preferable if the inventive practitioner is creating the object de novo. The first basic inventive approach can also be effectuated for creating an object de novo; typically in accordance therewith, a pigmented resinous matrix coating would be applied to the molded molten structural substrate shape during curing, thereby forming the completed product.

A third basic approach to making a moldable/castable product involves retrofitting a finished inventive resinous matrix entity with respect to another finished entity. The finished inventive molded/casted product is made a part of an overall structural entity via its superpositioning upon another finished body (which, typically, has been separately molded/casted). This is analogous to the first basic approach insofar as a substrate is implemented, and inventive matrix material is applied thereto; however, here the inventive matrix material is finished rather than applied as a liquid resinous coating. A finished form according to the third basic approach is exemplified in FIG. 5A. If the practitioner wishes to treat an existing object, the third basic approach may be preferred for many inventive embodiments. In essence, the third basic approach describes a retrofit process, since it is not necessary that the shaped substrate be molten; that is, the shaped substrate could already be a finished (completely cured) object.

Accordingly, selection of the inventive fabrication methodology depends upon the need, e.g., whether the need involves an existing entity to be inventively treated, or the need involves a to-be-fabricated inventive entity. In this regard, the inventive practitioner should also consider the volume and cost of the materials to be used.

Generally speaking, the inventive compositions function equally well whether constituted as a coating or as a casting. The photoexposure surface(s) of any shaped object is (are) what require treatment; hence, generally, there is no need to have through-the-thickness performance attributes. Still, there are inventive embodiments which are characterized by through-the-thickness performance during service, and preferably so in order to extend service life; however, one should recognize that, generally, wearing (and thus partial smoothing) of the photoexposure surface will deteriorate inventive performance somewhat.

Still referring to FIG. 5 and FIG. 5A, and again referring to FIG. 4 and FIG. 4A, it is seen in these figures that the present invention can be practiced so as to delineate or demarcate shapes such as symbols, figures, characters, etc. This is inventively accomplished by implementing different particulate combinations in each of two or more regions (areas) of inventive matrix 10. Each region of inventive matrix 10 includes its own regional surface portion of interfacing matrix surface 18. An inventively inscribed directional arrow sign is portrayed in FIG. 4. An inventively inscribed standing hollow conical hazard sign is portrayed in FIG. 5.

There are numerous ways of inventively altering different regions of inventive matrix 10 so as to create contrast among two or more such regions, such as regions 71 and 72 shown in FIG. 4 and FIG. 5. Region 71 includes regional surface portion 73; region 72 includes regional surface portion 74. As depicted in these figures, region 71 defines the letters of a word; region 72 frames the letters defined by region 71.

For these "delineative" embodiments, the generally operative inventive principle is to change the proportions of the three (retroreflective spheres 16, luminescent pigments 42 and reflective pigments 43) or four (also including abrasive elements 44) types of particulate entities so as to achieve a contrasting visual effect. These changes can be qualitative and/or quantitative with respect to one, two, three or all four particulate entities. In the light of this disclosure, multifarious ways of practicing this invention "contrastingly" will be apparent to the ordinarily skilled artisan.

For instance, regions 71 and 72 can each be provided with photoreflective spheres 16 (partially projecting at regional surface portions 73 and 74, respectively) which are characterized by distinguishable translucent colors or hues. And/or, regions 71 and 72 can each be provided with greater and lesser numbers of photoreflective spheres 16, creating an especially contrasting effect when matrix 10 is viewed approximately straight-on (e.g., orthogonally with respect to interfacing matrix surface 18, which typically is approximately planar). And/or, regions 71 and 72 can each be provided with greater and lesser numbers, and/or different colors/hues, of luminescent pigments 42. And/or, regions 71 and 72 can each be provided with greater and lesser numbers, and/or different colors/hues, of reflective pigments 43. And/or, regions 71 and 72 can each be provided with greater and lesser numbers, and/or different colors/hues, of specular reflective pigments 43s and diffuse reflective pigments 43d.

A preferred approach to attaining regional contrast involves variation of abrasive elements 44 from region to region. In this regard, for instance, regions 71 and 72 can each be provided with different proportions, and/or different colors/hues, of the two protrusive elements, viz., photoreflective spheres 16 and abrasive elements 44. For example, region 71 can be rendered predominately photoreflective spheres 16 (partially projecting at regional surface portion 73), while region 72 is rendered predominately abrasive elements 44 (partially projecting at regional surface portion 74), or vice versa. As an additional touch, photoreflective spheres 16 can have a different color/hue in region 71 versus region 72; similarly, abrasive elements 44 can have a different color/hue in region 71 versus region 72.

Typically among the inventive embodiments which include both retroreflective spheres 16 and abrasive elements 44, the retroreflective spheres 16 and the abrasive elements 44 are present (with substantially all of spheres 16 and elements 44 partially projecting at interfacing matrix surface 18) in a ratio of at least about nine-to-one (9:1), by volume, of retroreflective spheres 16 to abrasive elements 44

(i.e., at least ninety percent retroreflective spheres 16 versus no more than ten percent abrasive elements 44). Inventive regionally contrastive embodiments will typically employ such ratio at at least one region, and reverse the ratio (at least about nine-to-one of abrasive elements 44 to retroreflective spheres 16, i.e., at least ninety percent abrasive elements 44 versus no more than ten percent retroreflective spheres 16) at at least another region. In fact, some such inventive embodiments utilize retroreflective spheres (but no abrasive elements 44) at at least one region, and abrasive elements 44 (but no retroreflective spheres 16) at at least another region.

Inventive coatings are producible and practicable either: as a complete, self-contained particulate-containing resinous liquid mixture; or, as a separate combination of an incomplete particulate-containing resinous liquid mixture and non-mixed particles. An inventive liquid resinous composition can comprise either a latex-based resinous system (such as urethanes or acrylics), or a mineral-based resinous system (such as varnishes, robust polyurethanes, acrylics, etc.).

An inventive "complete" mixture contains, mixed in the uncured resinous liquid, all three (or, if inventively endowed with abrasiveness, all four) of the particulate ingredients, viz., retroreflective, reflective and luminescent entities (and, if inventively endowed with abrasiveness, abrasive entities). These complete mixtures are ready to be applied (e.g., painted onto an object). Complete, ready-to-be-applied inventive compositions are deficient, however, because of the inability or diminished ability, when applied, to achieve a desirable stratification of the particulate ingredients, such as described hereinabove in connection with FIG. 3.

Another inventive compositional methodology utilizes an "incomplete" mixture. An inventive "incomplete" mixture contains, mixed in the uncured resinous liquid, two of the particulate ingredients, viz., reflective and luminescent entities. In typical inventive practice, the incomplete mixture is applied to a substrate; then (as further described hereinbelow), while the incomplete mixture is curing (e.g., drying), the retroreflective spheres are generously added as an overlay. For such inventive embodiments involving endowment with abrasiveness, abrasive elements are more sparingly added as part of the overlay.

Inventive applique device embodiments, inventive cast article embodiments and inventive "incomplete" paintable/coatable composition embodiments readily lend themselves to achieving the above-described "layering." However, as noted hereinabove, such layering is considerably more difficult to obtain when practicing inventive "complete" paintable/coatable composition embodiments.

The inventive two-strata matrix 10 system shown in FIG. 3 can be considered to be representative of a typical inventive applique device embodiment, or a typical inventive cast article embodiment, or a typical inventive "incomplete" paintable/coatable composition embodiment. If this arrangement is envisioned as comprising an applique, noninterfacing matrix surface 19 of inventive matrix 10 is next to an adhesive 60 layer (such as shown in FIG. 4), which in turn is next to a substrate 12. If envisioned as comprising a cast article, inventive matrix 10 is typically employed in stand-alone fashion (i.e., the absence of a supporting structure such as that which includes substrate 12). If envisioned as comprising a cured particulate-containing composition, noninterfacing matrix surface 19 of inventive matrix 10 is next to substrate 12, an incomplete particulate-containing composition (i.e., a liquid resinous matrix material 14 containing photoluminescent pigments 42 and reflective pigments 43) having been applied in an uncured state to substrate 12, then retroreflective spheres 16 (and abrasive elements 44, if such embodiment involves abrasive attribution) having been distributed thereon as an overlay.

According to typical inventive fabrication methodology, photoluminescent pigments 42 and reflective pigments 43 are profusely mixed with resinous matrix material 14. Layering of inventive appliques and cast articles can be facilely attained by copiously "scattering" retroreflective spheres 16 onto the surface (described by interface 18) of resinous matrix material 14 (which contains, photoluminescent pigments 42 and reflective pigments 43) while resinous matrix material 14 is curing. Spheres 16 are retained in the cured matrix material 14 by the combined effects of (i) mechanical locking within matrix material 14, and (ii) adhesion of matrix material 14 to sphere surface outsides 31 as matrix material 14 cures. A similar mechanism of entrainment obtains for the less plentiful scattering of abrasive elements 44 onto the surface (described by interface 18) of curing resinous matrix material 14.

Layering of inventive paintable/coatable compositions can be similarly attained by copiously "scattering" retroreflective spheres 16 onto the surface of resinous matrix material 14 (which contains photoluminescent pigments 42 and reflective pigments 43), once resinous matrix material 14 has been "painted" onto an object (often preferably, laid on rather thickly) and while resinous matrix material 14 is curing (e.g, "drying"). Retention of spheres 16 in the dried matrix material 14 is similarly effected, via the mechanisms noted hereinabove, during the curing of matrix material 14.

In terms of manufacture, inventive applique embodiments (such as shown in FIG. 4) can more closely resemble either inventive paintable/coatable composition embodiments or inventive molded/casted embodiments (such as shown in FIG. 5).

That is, typical practice of inventive paintable/coatable composition embodiments involves a process which includes depositing an uncured liquid resinous particulate-containing matrix mixture onto a substrate, curing the matrix mixture, and distributing the retroreflective spheres (and, for some embodiments, the abrasive elements) atop the matrix mixture during the curing. Many inventive applique embodiments are made in accordance with this method, wherein the uncured liquid resinous particulate-containing matrix mixture is deposited onto the non-adhesive side of a substrate having a non-adhesive side and an opposite side which is or will be an adhesive side (e.g., covered by an adhesive material which is backed with paper, plastic sheet or stripping).

In inventive testing conducted by the United States Navy, an inventive applique and several inventive coatings were made. Notably, the U.S. Navy essentially effectuated the following procedure which is exemplary of an inventive methodology for production of an adhesively backed applique embodiment of the present invention.

A thermoplastic polymer (e.g., polypropylene) material is provided for purposes of making the substrative portion of the applique. According to many inventive embodiments, the thermoplastic polymer material is actually a thermoplastic polymeric mixture containing a light colored pigment (i.e., a diffusely reflective pigment such as titanium dioxide). The thermoplastic polymer material is introduced into an extruder barrel, heated to the melting point and extruded to the final desired form—for instance, an applique backing for a tape characterized by a desired finite width and a desired finite thickness. A typical thickness of an inventive applique (e.g., tape) would be approximately 1/16th inch thickness;

however, the thickness of the tape could be much thicker or thinner, depending upon embodiments and end-use needs.

A pigmented resinous matrix coating is provided for serving as the overlay stratum of the substrative portion. Depending upon the inventive embodiment, this pigmented resinous matrix coating is either a photoluminescent, photoreflective resinous matrix coating (i.e., contains photoluminescent pigments and photoreflective pigments) or a photoluminescent, photoreflective, retroreflective resinous matrix coating (i.e., contains photoluminescent pigments, photoreflective pigments and retroreflective spheres). The extruded thermoplastic polymer material is delivered to a cold conveyor, where it solidifies while being flow-coated or coil-coated with the pigmented resinous matrix coating. While curing, the incorporation of tactile elements (e.g., tactile-inducing grit) and retroreflective spheres is effected by simple surface addition (via dispersion techniques), the dispersed grit and dispersed retroreflective spheres thereby being cured into the pigmented resinous matrix coating following the applicattion of slight pressure.

Generally, regardless of whether the original pigmented resinous matrix coating contains retroreflective spheres, a quantity of retroreflective spheres is dispersed during curing at the surface of the pigmented resinous matrix coating. One possible inventive approach is that the substrate be coated with resinous matrix material containing photoluminescent pigments and photoreflective pigments and retroreflective spheres; additional retroreflective spheres (and tactile elements) are dispersed during curing onto the already-situated resinous matrix material. According to another possible inventive approach, the resinous matrix material coating need only contain the photoluminescent pigments and photoreflective pigments, and need not contain any retroreflective spheres—in other words, all of the retroreflective spheres to be used can be dispersed during curing (along with the tactile elements) onto the already-situated resinous matrix material.

According to some inventive embodiments, the dispersive application of the tactile grit and the retroreflective spheres to the surface of the resinous matrix coating includes implementation of a roller device or similar pressuring means. A small amount of pressure is applied (e.g., by a roller device) to assure partial embeddment of the added solids (grit and retroreflective spheres) into the matrix material. A significant point in this regard is that the inventive practitioner should avoid coating or covering the exposed portions of the retroreflective spheres with any resinous material.

In particular, typically a majority of the retroreflective spheres will be embedded in the resinous matrix coating to approximately half of their respective diameters; in other words, each retroreflective sphere will have an embedded retroreflective hemisphere and an exposed (to the atmosphere) retroreflective hemisphere. If the exposed retroreflective hemisphere were substantially or totally covered by resinous matrix coating material, this overcoating would diminish the retroreflectivity properties of the retroreflective sphere, that is, the efficiency with which it gathers and reflects incoming light. This would be so because the matrix material coating itself would establish another refractive index boundary.

Nevertheless, the inventors found that applying a slight amount of pressure to assure embedment of the retroreflective spheres (and thus their continued residence as a functional element in the product) does not deter from retroreflective performance. Additionally, the inventors found that coating over the tactility elements does not necessarily deter from their tactile attributes (thus allowing for the nonskid and/or tactile feel of the product), unless there is so much overcoating (e.g., wherein the interstices between retroreflective and tactile additives are filled in) as to have the surface approach that of smoothness.

As previously noted herein, according to some inventive embodiments, the thermoplastic polymer which is extruded to selected shape contains reflective pigmentation particulate, especially light colored (diffusely reflective) pigmentation. According to other inventive embodiments, the to-be-shaped substrative thermoplastic polymer need not include any pigmentation particulate. Generally, if the substrate lacks an adequate degree of diffusely reflective pigmentation, then the matrix overlayer must contain diffusely reflective pigmentation. If, however, the substrate is characterized by diffusely reflective pigmentation, then (depending on the inventive embodiment) the matrix overlayer does not necessarily contain diffusely reflective pigmentation.

The diffusely reflective pigmentational quality can be manifested by the substrate in either of two ways. Firstly, the substrate can contain diffusely reflective pigmentation particulate. Secondly, the substrate can (in the absence of added diffusely reflective pigmentation particulate) be diffusely reflective in color (generally, white is preferred). Thus, according to some inventive embodiments, diffusely reflective pigments can be eliminated from the matrix coating (e.g., eliminated from the matrix overlay stratum in the applique manufacturing process), so long as the to-be-covered substrate is already characterized by diffusely reflective pigmentation. Nevertheless, practically speaking, most inventive embodiments will not involve a substrate characterized by whiteness in color; therefore, most inventive embodiments will preferably include the diffusely reflective pigments in the overall composition because of the practical beneficial effects these pigments have on both reflectivities and photoluminescence enhancement.

Generally, a certain (usually, large) number of retroreflective spheres should be dispersed atop the resinous matrix material during the cure (that is, after the other components are formed). This will lead to the best retroreflection (and tactility, also). However, some inventive embodiments provide that all particulate ingredients (i.e., photoluminescent pigments and photoreflective pigments and retroreflective spheres) be distributed in a flowable liquid resinous matrix material, prior to undertaking any additional action involving application of such flowable liquid resinous matrix material to a substrate. Generally, this "complete" flowable liquid resinous matrix material will inventively perform in all aspects, including retroreflection, so long as the resinous matrix is optically clear; however, the inventive practitioner should expect to have tradeoffs in performance, due to the effects of deteriorated optics (in relation to the retroreflective spheres) and smoothing (in relation to the tactile elements).

After curing is completed, a suitable adhesive backing (e.g., a foamed adhesive or other form of adhesive backing) is provided, such adhesive backing having release paper applied to one of its two opposite surfaces. The adhesive backing is applied, using the exposed adhesive surface, to the underside (i.e., the surface opposite the pigmented resinous matrix coated surface) of the cured extruded thermoplastic polymer material. The final inventive product is a peel-and-stick type of signage suitable for marking pathways, road lanes, etc.

Inventive molded/casted embodiments are typically made by a process which includes depositing an uncured liquid resinous particulate-containing matrix mixture into a mold, curing the matrix mixture while in the mold, and distributing the retroreflective spheres (and, for some embodiments, the abrasive elements) atop the matrix mixture during the curing. Also, many inventive applique embodiments are made in accordance with this method, wherein the adhesive layer is added to a surface portion of the cured matrix mixture (i.e., subsequent to the completed curing of the matrix mixture). Some such embodiments additionally add, for "peel-and-stick" purposes, a sheet-like layer onto the adhesive layer.

Generally, the resinous matrix material used for inventive castable/moldable products should be stronger than that used for inventive appliques and inventive coatings. The practitioner who fabricates an inventive castable/moldable product will utilize a similar inventive composition as would be used in a coating or applique, with the notable exception that the base resin will be more robust after it cures. For instance, an inventive practitioner may use a vinyl resin as a base for a coating product, but use an epoxy or rigid urethane for a casting product.

Castable acrylics form hard "plexiglass like" objects and are also optically transparent, thus representing a good resin system for an inventive castable/moldable product. According to a typical inventive procedure for making an inventive castable acrylic product, the practitioner will pour a mixture of the luminescent and reflective pigments into the castable acrylic resin, doing so in a similar ratio as provided in a typical inventive coating formula. Then, the practitioner will pour the pigmented liquid acrylic resin into a mold shape. If the mold is a reusable mold, its walls preferably will have been treated with a nonstick, resin release spray coating or similar mold release product.

The practitioner then, during curing, distributingly coats the upper surface (prospective photoexposure surface) with the retroreflective spheres (and abrasive elements). Alternatively, the practitioner incorporates some or all of the retroreflective spheres (and abrasive elements), along with the luminescent and reflective pigments, into the mold itself. If the practitioner refrains from distributing the retroreflective spheres atop the photoexposure surface, or does so in insufficient numbers, the practitioner should recognize that some loss of retroreflective function will likely occur.

Liquid resins do not require heating in order to be useful. Even without heating, most two-part epoxies will flow, though generally they are somewhat viscous (e.g., molasses-like). Generally, the colder the liquid resin, the less flowable it is, as with other liquids. Generally, when a two-part epoxy is mixed, it will generate some internal heat from the crosslinking reaction of the two components; this will reduce the viscosity of the two-part mixture, thereby improving its fluidity. Generally, liquid resinous materials (even epoxies, which are more viscous then most resins) will flow at room temperature, and are useful products.

Improved fluidity is desirable for some inventive applications—for example, in filling a mold, wherein the practitioner wishes to wet all surfaces and fill all voids. In inventive practice, liquid resinous matrix materials are heated for many embodiments, but for other embodiments are not heated. For instance, the resinous matrix material need not be heated to be useful either as a coating resin or a "putty-like compound" formulation. Once the two liquid components of an unheated two-part epoxy crosslink, they solidify together; hence, when this type of product cures (crosslinking during the curing), it becomes a 100% solid object.

Basically, there are three inventive forms of resinous matrix material, each of which exists in a liquid (fluid) state prior to curing, viz., (i) thermosettable form, (ii) thermoplastic form and (iii) solvent-based form. A solvent-based resinous matrix material is applied as a liquid coating (like a paint) and becomes 100% solid when cured. A thermoplastic resinous matrix material (such as a polyethylene-based moldable compound) or thermosettable resinous matrix material can be heated and extruded or formed into a shape. A solvent-based resinous matrix material contains liquid solvent material to keep the viscosity low enough to "paint" with; however, the final volume shrinks due to the evaporation of the solvent. Hence, as pertains to solvent-based inventive embodiments, the formulation "in the can" would generally contain a percentage of solids which is appreciably less that 70%, to allow for evaporation or some of the volume upon drying.

When a liquid resinous matrix material is coated upon a molded substrative object, the molded substrative object need not be in the process of curing. The molded substrative object can be an already finished, cured product. In inventive practice, most coating will be performed over extant ambient temperature objects—for example, which require signage and nonskid attributes.

However, many inventive products are "co-cured," that is, manufactured together such that the final exterior coating has intimate bonding and adhesion to the structural substrate. Among other advantages, co-curing can provide better final performance as well as savings in the industrial heating required for the overall process. According to typical co-cured inventive embodiments, an inventive product form (e.g., an inventive applique or inventive liquid resinous material) is placed in a mold along with substrative castable/moldable material. The mold is closed and heated to accelerate co-curing.

Contrasting regionalization can be achieved by implementing one or more "detail" molding devices (e.g., partition-like or wall-like devices akin to "cookie-cutters"). For instance, detail molding devices corresponding to each letter in the word shown in FIG. 4, FIG. 4A, FIG. 6 and FIG. 5A can be appropriately situated within a main mold or atop a substrate so as to spell such word. Placement and removal, and timing of such, of each detail mold is in accordance with the preferred variation of the particulate entities.

If, for example, the protrusive particulate entities (i.e., photoreflective spheres 16 and abrasive elements 44) are varied for contrast purposes, the molding devices can be positioned, and then the protrusive particulate entities selectively distributed, after the luminescent-and-reflective-particulate-containing liquid resinous matrix material has been poured onto the substrate or into the main mold. If, for example, the nonprotrusive particulate entities (i.e., luminescent pigments 42 and reflective pigments 43) are varied for contrast purposes, the molding devices can be positioned, and then the nonprotrusive particulate entities selectively distributed, after the barren liquid resinous matrix material has been poured onto the substrate or into the main mold; if desired, the molding devices can be removed prior to distribution of the protrusive particulate entities.

In this manner, one or more detail molds are implemented for providing contrasting indicia. For inventive embodiments which utilize a main mold for fabrication of an inventive article, these detail molds represent auxiliary mold devices (which determine detailed visual features of the article), as distinguished from the main mold device (which determines the overall shape of the article).

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A visibility-enhancing, tactility-enhancing adherent device comprising a matrix layer and an adhesive layer; said matrix layer comprising a resinous matrix material, a plurality of retroreflective spheres, a plurality of reflective pigments, a plurality of luminescent pigments and a plurality of abrasive elements; said resinous matrix material containing said retroreflective spheres, said reflective pigments, said luminescent pigments and said abrasive elements; said resinous matrix material having a photoexposure surface; said retroreflective spheres and said abrasive elements generally being disposed protrudingly at said photoexposure surface; said reflective pigments and said luminescent pigments generally being disposed beneath said photoexposure surface; said matrix layer including a plurality of matrix regions; each said matrix region having a corresponding surface region of said photoexposure surface; at least two said matrix regions differing in at least one characteristic pertaining to at least one of said retroreflective spheres, said reflective pigments and said luminescent pigments; said at least one characteristic being selected from the group of characteristics consisting of color and concentration; said differing being visually appreciable so that at least two said matrix regions contrastingly define at least one communicative form.

2. A visibility-enhancing, tactility-enhancing adherent device as in claim 1, wherein said resinous matrix material has a nonphotoexposure surface which is opposite said photoexposure surface, said nonphotoexposure surface abutting said adhesive layer.

3. A visibility-enhancing, tactility-enhancing adherent device as in claim 2 comprising a removable sheet layer, said adhesive layer being interposed between said matrix layer and said removable sheet layer.

4. A visibility-enhancing, tactility-enhancing adherent device as in claim 1 comprising a substrate layer, said substrate layer being interposed between said matrix layer and said adhesive layer.

5. A visibility-enhancing, tactility-enhancing adherent device as in claim 4 comprising a removable sheet layer, said adhesive layer interposed between said substrate layer and said removable sheet layer.

6. A visibility-enhancing, tactility-enhancing adherent device as in claim 1, wherein said reflective pigments include at least one of specular reflective pigments and diffuse reflective pigments.

7. A visibility-enhancing, tactility-enhancing adherent device as in claim 6, wherein:
    said reflective pigments include said specular reflective pigments and said diffuse reflective pigments;
    at least two said matrix regions differ in at least said characteristic pertaining to said reflective pigments; and
    said differing of at least two said matrix regions in at least one said characteristic pertaining to said reflective pigments includes differing of at least two said matrix regions in at least one said characteristic pertaining to at least one of said specular reflective pigments and said diffuse reflective pigments.

8. A visibility-enhancing, tactility-enhancing adherent device as in claim 1, wherein said at least one communicative form includes at least one type of symbolism selected from the group consisting of symbol, figure, character, picture and arrow.

9. A visibility-enhancing, tactility-enhancing adherent device as in claim 1, wherein:
    at least two said matrix regions differ in at least one said characteristic pertaining to said abrasive elements; and
    said differing of at least two said matrix regions in at least one said characteristic pertaining to said abrasive elements enhances said contrasting definition of said at least one, communicative form.

10. A visibility-enhancing, tactility-enhancing adherent device as in claim 1, at least two said matrix regions differing in the concentration of said abrasive elements.

11. A visually and tactilely enhanced article comprising a particulate-containing matrix, wherein:
    said particulate-containing matrix includes a resinous matrix material, a plurality of retroreflective spheres, a plurality of photoreflective pigments, a plurality of photoluminescent pigments and a plurality of abrasive elements;
    said resinous matrix material contains said retroreflective spheres, said photoreflective pigments, said photoluminescent pigments and said abrasive elements;
    said resinous matrix material has a matrix surface portion which is exposable to light from an exterior source;
    said retroreflective spheres and said abrasive elements generally are disposed protrudingly at said matrix surface portion;
    said photoreflective pigments and said photoluminescent pigments generally are disposed beneath said matrix surface portion;
    said particulate-containing matrix includes a plurality of matrix sections;
    each said matrix section has a corresponding surface area of said matrix surface portion;
    at least two said matrix sections differ in at least one characteristic pertaining to at least one of said retroreflective spheres, said reflective pigments and said luminescent pigments;
    said at least one characteristic is selected from the group of characteristics consisting of color and concentration; and
    said differing is visually appreciable so that at least two said matrix sections contrastingly define at least one communicative form.

12. A visually and tactilely enhanced article as in claim 11, wherein said photoreflective pigments include at least one type of photoreflective pigment selected from the group consisting of specular pigments and diffuse pigments.

13. A visually and tactilely enhanced article as in claim 12, wherein said diffuse pigments include at least one material selected from the group consisting of titanium dioxide and barium sulfate.

14. A visually and tactilely enhanced article as in claims 12, wherein said specular pigments include at least one material selected from the group consisting of aluminum, quartz, mica, pearlescent and nacreous.

15. A visually and tactilely enhanced article as in claim 11, wherein said retroreflective spheres include at least one material selected from the group consisting of glass, plastic and ceramic.

16. A visually and tactilely enhanced article as in claim 11, wherein said retroreflective spheres include at least one ceramic material selected from the group consisting of zirconia, alumina, silica and titania.

17. A visually and tactilely enhanced article as in claim 11, wherein said photoluminescent pigments include at least one type of photoluminescent material selected from the group consisting of phosphorescent, fluorescent and bioluminescent.

18. A visually and tactilely enhanced article as in claim 11, wherein said photoluminescent pigments include at least one material selected from the group consisting of aluminate and strontium aluminate: (rare earth element).

19. A visually and tactilely enhanced article as in claim 11, wherein said resinous matrix material includes at least one material selected from the group consisting of epoxy, polyurethane, silicone, vinyl and acrylic.

20. A visually and tactilely enhanced article as in claim 11, wherein said resinous matrix material includes at least one material selected from the group consisting of latex-based resinous material and mineral-based resinous material.

21. A visually and tactilely enhanced article as in claim 11, wherein said abrasive elements include at least one material selected from the group consisting of aluminum oxide, silica and carbide.

22. A visually and tactilely enhanced article as in claim 11 which is also adhesively enhanced, wherein:
   said matrix surface portion is a first matrix surface portion;
   said resinous matrix material has a second matrix surface portion which is for adherence to an object; and
   said article comprises an adhesive substance which at least substantially covers said second matrix surface portion.

23. A visually and tactilely enhanced article as in claim 11, wherein said retroreflective spheres at least substantially cover said matrix surface portion.

24. A visually and tactilely enhanced article as in claim 11, wherein said photoluminescent pigments and said photoreflective pigments are present in said particulate-containing matrix at approximately a fifty-fifty ratio of said photoluminescent pigments to said photoreflective pigments.

25. A visually and tactilely enhanced article as in claim 11, wherein said photoluminescent pigments and said photoreflective pigments are present in said particulate-containing matrix so as to aggregately constitute a percentage by volume of said particulate-containing matrix which is in the range greater than zero percent and no more than approximately seventy percent.

26. A visually and tactilely enhanced article as in claim 11, wherein said particulate-containing matrix has been made by the process comprising:
   mixing said photoluminescent pigments and said photoreflective pigments with said resinous matrix material, while said resinous matrix material is in an uncured liquid state;
   depositing in a mold said resinous matrix material which is in an uncured liquid state and which contains said photoluminescent pigments and said photoreflective pigments;
   curing said resinous matrix material which is in an uncured liquid state and which contains said photoluminescent pigments and said photoreflective pigments, while said resinous matrix material is in said mold;
   using at least one partitioning device in relation to said resinous matrix material, for effecting at least two said matrix regions;
   distributing said retroreflective spheres atop said resinous matrix material, during said curing; and
   distributing said abrasive elements atop said resinous matrix material, during said curing.

27. A visually and tactilely enhanced article as in claim 11, wherein said at least one communicative form includes at least one type of symbolism selected from the group consisting of symbol, figure, character, picture and arrow.

28. A visually and tactilely enhanced article as in claim 11, wherein at least two said matrix sections differ in the concentration of said abrasive elements.

29. A visually and tactilely enhanced article as in claim 11, wherein:
   at least two said matrix sections differ in at least one said characteristic pertaining to said abrasive elements; and
   said differing of at least two said matrix sections in at least one said characteristic pertaining to said abrasive elements enhances said contrasting definition of said at least one communicative form.

* * * * *